(12) United States Patent (10) Patent No.: US 8,942,542 B1
Sherrets et al. (45) Date of Patent: Jan. 27, 2015

(54) VIDEO SEGMENT IDENTIFICATION AND ORGANIZATION BASED ON DYNAMIC CHARACTERIZATIONS

(75) Inventors: Doug Sherrets, San Francisco, CA (US); Brett Rolston Lider, San Francisco, CA (US); Murali Krishna Viswanathan, Paris (FR); Sean Liu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/611,675

(22) Filed: Sep. 12, 2012

(51) Int. Cl.
*H04N 9/80* (2006.01)
(52) U.S. Cl.
USPC ............ 386/262; 386/290; 386/248; 386/241
(58) Field of Classification Search
USPC .......... 386/232, 285, 248, 326, 262, 290, 241
See application file for complete search history.

(56) References Cited

U.S. PATENT DOCUMENTS

| | | | | |
|---|---|---|---|---|
| 5,956,037 A * | 9/1999 | Osawa et al. | ................. | 345/418 |
| 6,370,316 B1 * | 4/2002 | Yamada et al. | ............... | 386/230 |
| 7,702,014 B1 * | 4/2010 | Kellock et al. | ........... | 375/240.08 |
| 8,732,193 B2 * | 5/2014 | Skeen et al. | ................. | 707/769 |
| 2003/0182118 A1 * | 9/2003 | Obrador et al. | ............... | 704/246 |
| 2005/0086692 A1 * | 4/2005 | Dudkiewicz et al. | ........... | 725/46 |
| 2007/0061023 A1 * | 3/2007 | Hoffberg et al. | ................ | 700/83 |
| 2008/0193101 A1 * | 8/2008 | Agnihotri et al. | ............... | 386/52 |
| 2009/0080857 A1 * | 3/2009 | St. John-Larkin | .............. | 386/83 |
| 2010/0332959 A1 * | 12/2010 | Mitchell et al. | ............... | 715/202 |
| 2011/0058056 A1 * | 3/2011 | Lindahl et al. | ............. | 348/222.1 |
| 2012/0185889 A1 * | 7/2012 | Folgner et al. | .................. | 725/13 |
| 2013/0238419 A1 * | 9/2013 | Glick et al. | ................ | 705/14.41 |
| 2014/0013228 A1 * | 1/2014 | Hutten | .......................... | 715/720 |
| 2014/0115441 A1 * | 4/2014 | Badoiu et al. | ................. | 715/230 |

* cited by examiner

*Primary Examiner* — Helen Shibru
(74) *Attorney, Agent, or Firm* — Amin, Turocy & Watson, LLP

(57) ABSTRACT

This disclosure relates to video segment identification and organization based on dynamic characterizations. A characteristics component analyzes a video, and determines a set of video characteristics based at least in part on the analysis. The video characteristics include but are not limited to a category, a type, an identity of a person, and/or an identity of an object. A segmenting component segments the video based in part on the set of video characteristics, and an indicator component associates indicators corresponding to respective video characteristics with the corresponding video segments.

24 Claims, 14 Drawing Sheets

VIDEO SEGMENT IDENTIFICATION AND ORGANIZATION BASED ON DYNAMIC CHARACTERIZATIONS

TECHNICAL FIELD

This disclosure generally relates to systems and methods that facilitate video segment identification and organization based on dynamic characterizations.

BACKGROUND

The Internet and media enabled portable computing devices have dramatically altered the processes for generating and consuming media content. Presently, users can consume media content virtually anywhere at any time, as long as they have access to a media capable device with an Internet connection. The convenience of being able to view media content via the Internet, essentially on demand, has resulted in explosive growth of Internet media consumption. Internet media traffic is currently approaching a majority of consumer Internet traffic, and the rate of demand is projected to continue increasing.

The sheer quantity of media content available to users can make selecting content for consumption challenging. Millions of people around the world have the capability to produce media content, and popular online services can receive tens of hours worth of newly uploaded user-generated content every minute. In addition, traditional media outlets now have the ability to enable consumers to access archives containing large amounts of older media content, along with newly generated content. Users may overlook available content well suited to their individual preferences because of an inability to locate or identify the content.

A technique that been commonly employed to assist users in identifying media content for consumption includes enabling content creators or owners to apply descriptions or tags to their content. Additionally, content is often organized or associated with similar content based on the descriptions or tags. However, descriptions provided by content owners may provide insufficient amounts of detail to enable consumers to determine desirable content. Moreover, some content owners may mischaracterize or incorrectly describe content.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular implementations of the specification, or any scope of the claims. Its sole purpose is to present some concepts of the specification in a simplified form as a prelude to the more detailed description that is presented later.

According to an aspect of the subject innovation, systems and methods for video segment identification and organization based on dynamic characterizations are disclosed. A characteristics component analyzes a video, and determines a set of video characteristics based at least in part on the analysis. The video characteristics include but are not limited to a category, a type, an identity of a person, and/or an identity of an object. A segmenting component segments the video based in part on the set of video characteristics, and an indicator component associates indicators corresponding to respective video characteristics with the corresponding video segments.

In an implementation, a playback component provides playback of a video, a rendering component renders indicators corresponding to respective video characteristics included in associated segments of the video, wherein the video characteristics include at least one of a category, a type, an identity of a person, or an identity of an object, and a skipping component provides for skipping at least one segment of the video based at least in part on the indicators.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
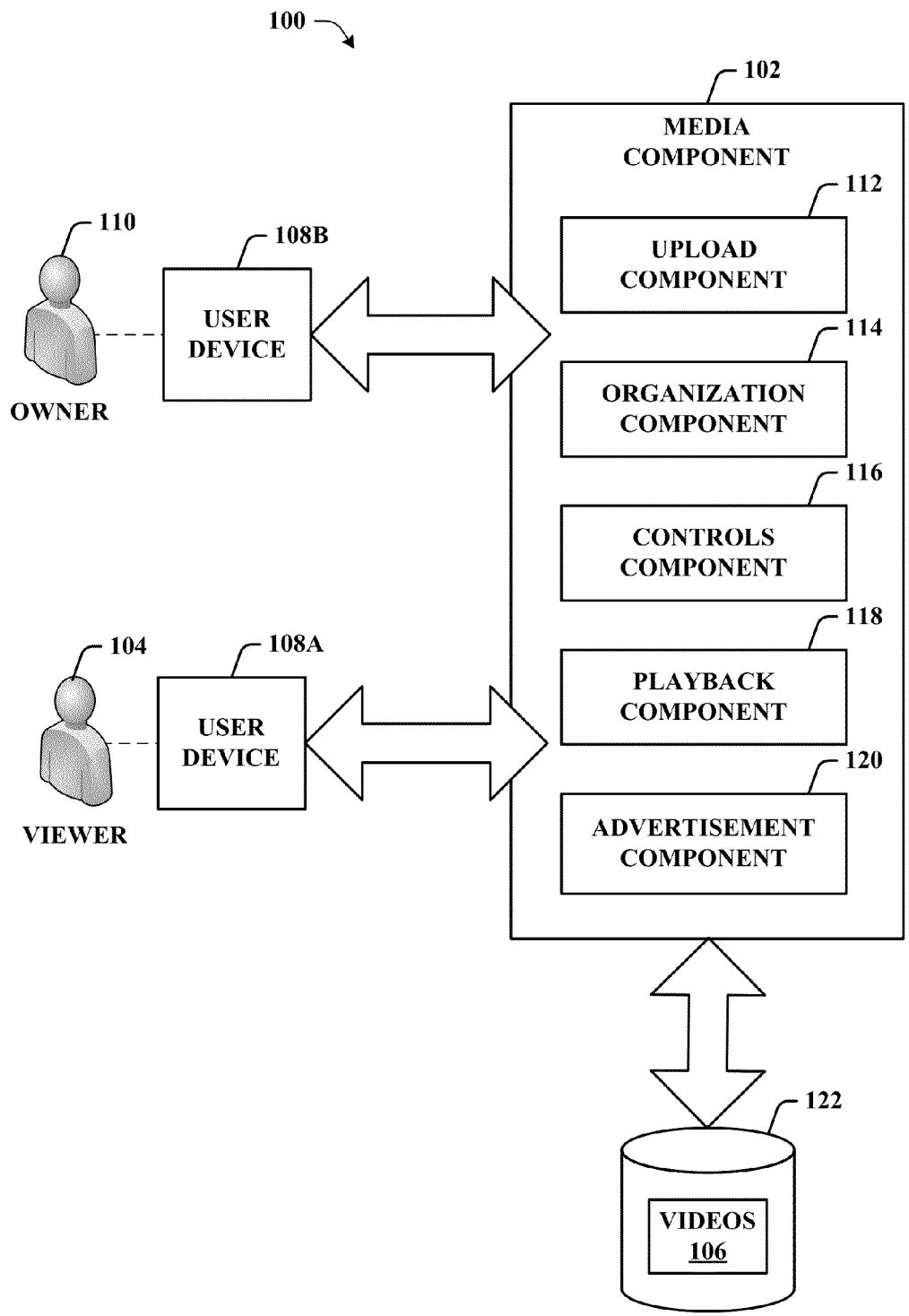
FIG. 1 illustrates an example system for video segment identification and organization based on dynamic characterizations in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can opt-in or opt-out of providing personal information, location information, proprietary information, sensitive information, or the like in connection with data gathering aspects. Moreover, one or more implementations described herein can provide for anonymizing collected, received, or transmitted data.

One non-limiting implementation of this disclosure provides for accurate and efficient video segment identification and organization based on dynamic characterizations. More particularly, in accordance with an implementation, a playback component provides playback of a video, a rendering component renders indicators corresponding to respective video characteristics included in associated segments of the video, wherein the video characteristics include at least one of a category, a type, an identity of a person, or an identity of an object, and a skipping component provides for skipping at least one segment of the video based at least in part on the indicators.

Non-Limiting Examples of Systems for Video Segment Identification and Organization Based on Dynamic Characterizations Turning now to FIG. 1, illustrated is an example system 100 for video segment identification and organization based on dynamic characterizations in accordance with various aspects described in this disclosure. Generally, system 100 can include a memory that stores computer executable components and a processor that executes computer executable components stored in the memory, examples of which can be found with reference to FIG. 14. System 100 includes a media component 102. The media component 102 streams, transmits, or otherwise provides media content to a content viewer 104 (viewer 104). For example, in one implementation, the media component 102 provides videos included in a set of videos 106 to a user device 108A (device 108A) associated with the viewer 104 via a network connection. The user device 108 can include but are not limited to a smart phone, a cell phone, a personal digital assistant (PDA), a tablet, a laptop, a desktop, a portable music player, a video game system, an electronic reader (e-reader), global positioning system (GPS), a set-top box, and/or a television. The media component 102 includes an upload component 112, an organization component 114, a controls component 116, a playback component 118, and an advertisement component 120. It is to be appreciated that although the media component 102 is illustrated as being a stand-alone component, such implementation is not so limited. For example, the media component 102 can be included in a content server, a user device (e.g., user device 108), a multimedia player, and so forth.

The upload component 112 provides for a content owner to initiate an upload of media content to the media component 102. For example, in one implementation, the user 110 (e.g., content owner, distributor, uploader, manager, etc.) can upload videos from a device 108B using a network connection. As an additional or alternative example, in one implementation, the upload component 112 provides for the owner to initiate capture of video at the media component 102. For instance, the media component 102 can capture video using a camera and/or microphone included in the device 108B (e.g., via a network connection), and maintain the captured video in the set of videos 106 without uploading from the device 108B.

The organization component 114 detects, identifies, or otherwise determines characteristics included in a video (video characteristics), and organizes (or identifies) segments of the video (video segments) based in part on the characteristics. For example, in one implementation, the organization component 114 determines the video characteristics within a predetermined amount of time of an upload or capture initiation. The video characteristics can include but are not limited to a subject matter (e.g., news, sports, music, entertainment, movies, television, etc.), a content type (e.g., slide show, commentary, known clip, action scene, etc.), an identity of a person included in a portion of the video, an identity of an object included in a portion of the video, and/or a location. For instance, the organization component 114 can determine that the video includes a person that is speaking (commentary).

In one implementation, the organization component 114 determines (or identifies or demarcates or organizes) segments of the video (video segments) based on location, arrangement, and/or presence of respective video characteristics, and associates indicators corresponding to the respective video characteristics with the video segments. For instance, the first seventeen seconds of a video can include a first characteristic (e.g., commentary), and the next fifteen seconds of the video can include a second characteristic (e.g., still images). The organization component 114 can determine that the video includes a first segment (e.g., the first seventeen seconds) and a second segment (e.g., the second fifteen seconds) based on the presence of the video characteristics in the respective segments. In addition, the organization component 114 can associate a first indicator corresponding to the first characteristic with the first segment, and a second indicator corresponding to the second characteristic with the second segment. The indicators can include, but are not limited to, icons, colors, flags, bits, and/or textual descriptors. Aspects of the subject disclosure are not limited to a type of indicator. For example, the indicators can include but are not limited to colors, icons, flags, bits, and/or textual descriptors that provide information regarding video characteristics included in a video segment. In addition, aspects of the subject disclosure are not limited to a quantity of indicators. For example, X different indicators corresponding to respective X characteristics can be associated with a single video segment, where X is an integer.

The controls component 116 provides for the user 110 to determine, set, or otherwise control one or more control parameters regarding characteristics associated with a video. For example, in one implementation, the user 110 can set a control parameter to prevent a subset of the characteristics from being associated with the video and/or provided to viewers (e.g., viewer 104). The playback component 118 streams, transmits, or otherwise plays videos in the set of videos 106, provides the associated indicators during playback, and provides for controlling playback of the video based at least in part on the indicators. For example, a policy associated with a particular viewer 104 (viewer policy) may require the playback component 118 to skip a video segment, because of an indicator associated with the video segment. As an additional or alternative example, the playback component 118 can play videos based on a set of policies associated with selected indicators. For instance, the viewer 104 may have a policy to always skip video segments associated with a first indicator (e.g., 'commentary' indicator).

The advertisement component 120 provides advertisements (e.g., targeted advertisements) based on indicators associated with a video. For example, in one implementation, an advertiser may determine that an advertisement should only be shown during portions of a video associated with a first indicator. For instance, a sporting goods company may want to show their advertisements only during sports highlights, and the advertisement component 120 can display, trigger, initiate, or otherwise provide the advertisement during portions of videos associated with an indicator corresponding to sports highlights. It is to be appreciated that although the videos 106 are illustrated as being maintained in a data store 122, other implementation are also possible. For example, the set of videos 106 can be included in the media component 102, a user device (e.g., device 108A), and/or in another location, wherein the media component 102 may access the set of videos 106 via a network connection.

Figure 2:
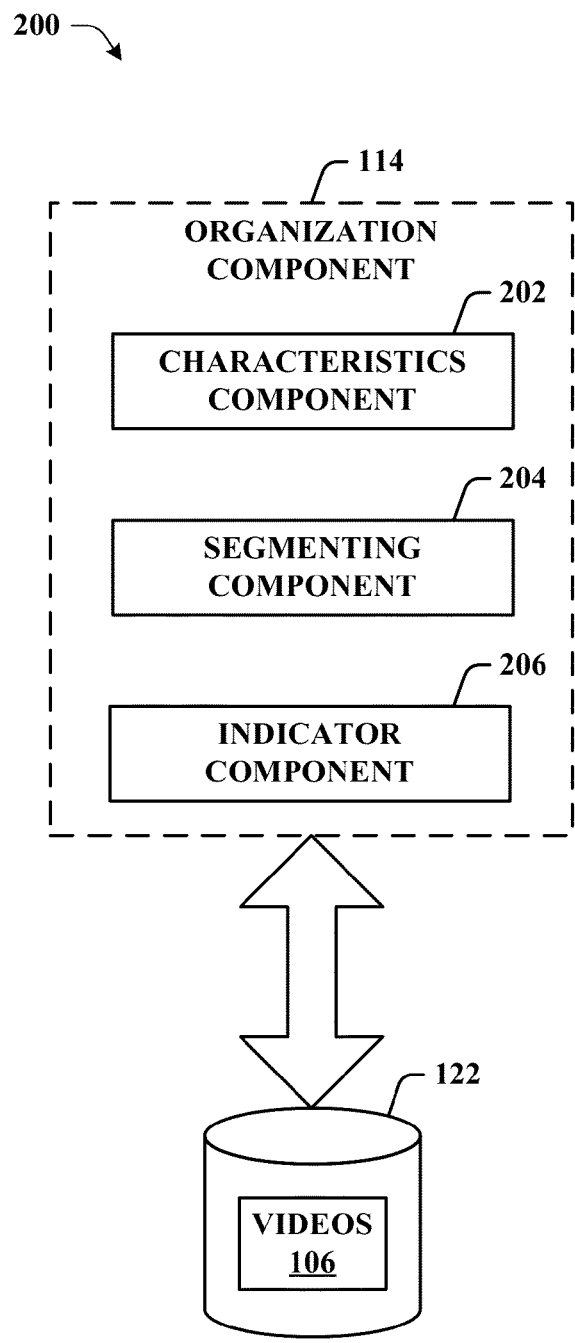
FIG. 2 illustrates an example organization component in accordance with various aspects described in this disclosure.

FIG. 2 illustrates an example organization component 114 in accordance with various aspects described in this disclosure. As discussed, the organization component 114 determines characteristics included in a video (video characteristics), and organizes segments of the video (video segments) based in part on the characteristics. For example, in one implementation, the organization component 114 determines the video characteristics within a predetermined amount of time of initiation of an upload and/or capture. The organization component 114 in FIG. 2 includes a characteristics component 202, a segmenting component 204, and an indicator component 206.

The characteristics component 202 inspects, examines, or otherwise analyzes the video, and determines (or infers) video characteristics based at least in part on the analysis. For example, in one implementation, the characteristics component 202 analyzes audio data, video data, and/or additional data included in or associated with a video (discussed in greater detail with reference to FIG. 3). For instance, the characteristics component 202 can analyze a video, determine that a first length of the video (e.g., two minutes) includes low quality audio and a speaker having a substantially stationary location, and based on the analysis determine (or infer) that the first length of the video includes commentary.

The segmenting component 204 divides, separates, or otherwise segments videos (e.g., into video segments) based at least in part on the video characteristics determined using the characteristics component 202. For example, in one implementation, the segmenting component 204 appends, attaches, or otherwise adds segment start points and/or stop points to a video based in part on the video characteristics. For instance, a first length of a video (e.g., 0 to 35 seconds) may include a slide show, and a second length of a video may include commentary (e.g., 36 seconds to 5 Mins). The segmenting component 204 adds a first segment start point at the beginning of the first length (e.g., 0 seconds), a first segment stop point at the end of the first length (e.g., 35 seconds), a second segment start point at the beginning of the second length (e.g., 36 seconds), and a second segment stop point at the end of the second length (e.g., 5 Mins).

The indicator component 206 attaches, appends or otherwise associates indicators with corresponding video segments. The indicators can include colors, icons, flags, bits, and/or textual descriptors that provide information regarding video characteristics included in a video segment. For example, in one implementation, the indicator component 206 can associate colors corresponding to respective video characteristics with portions of a video seek bar (play/pause bar, time bar, etc.) representing video segments that include the respective characteristics (discussed in greater detail with reference to FIG. 7). Aspects of the subject disclosure are not limited to the discussed types of indicator. For example, the indicators can include but are not limited to colors, icons, flags, bits, and/or textual descriptors that provide information regarding video characteristics included in a video segment. In addition, aspects of the subject disclosure are not limited to a quantity of indicators associated with video segments. For example, X indicators corresponding to respective X characteristics can be associated with a single video segment, where X is an integer. In addition, a first characteristic can be included in a plurality of video segments. For example, a first video segment can include commentary, and the commentary can continue into a second video segment.

The video segments and/or indicators provide intuitive viewer control of video playback based on video characteristics. For example, a viewer may desire to view a sports clip, but may be uninterested in commentary. The viewer can fast forward or skip video segments containing commentary. In addition, the viewer can quickly identify videos that include primarily, or solely, commentary about a sports clip, and do not contain the desired sports clip. Additionally or alternatively, in one implementation, viewers and/or content owners can create playlists of video segments and/or share video segments. For instance, a viewer may desire to share, e.g., via a social networking website, only a segment of a video that includes commentary, or create a playlist of slam dunks by his/her favorite basketball player without any commentary. Additionally or alternatively, in one implementation, the video segments and/or indicators provide for advertising within a video. For instance, a perfume company may desire to advertise a new scent during video segments including a celebrity endorsing the scent.

Figure 3:
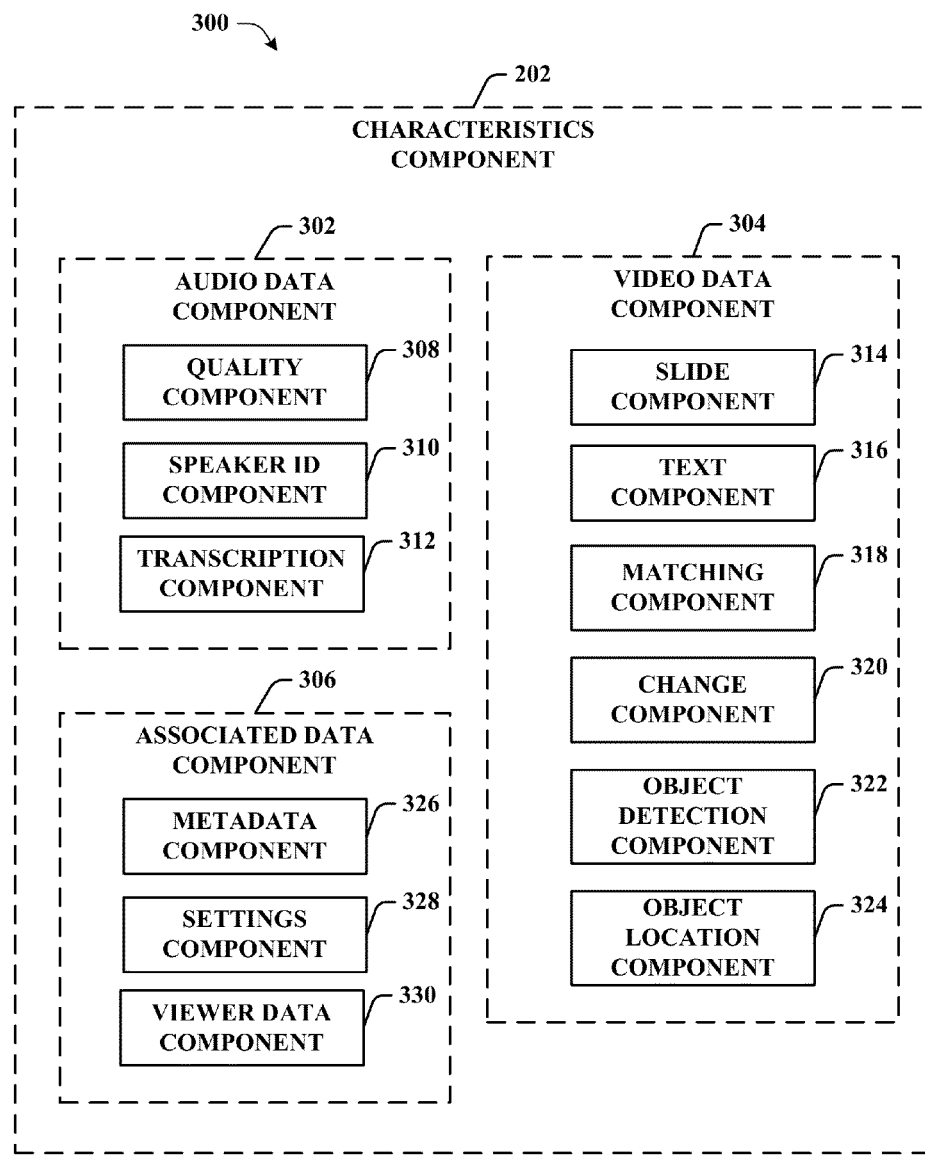
FIG. 3 illustrates an example characteristics component in accordance with various aspects described in this disclosure.

FIG. 3 illustrates an example characteristics component 202 in accordance with various aspects described in this disclosure. As discussed, the characteristics component 202 inspects, examines, or analyzes a video, and determines video characteristics based at least in part on the analysis. The characteristics component 202 in FIG. 3 includes an audio data component 302, a video data component 304, and an associated data component 306.

The audio data component 302 inspects, examines, or otherwise analyzes audio data (e.g., audio signals) included in, or associated with, a video, and facilitates determination of video characteristics based on the analysis. The audio data component 302 includes a quality component 308, a speaker identification component 310 (speaker id component 310), and a transcription component 312. The quality component 308 detects, determines, or otherwise classifies a quality of an audio signal (audio signal quality classification) included in the video based on a set of classification criteria. The classification criteria can include but is not limited to satisfaction of a high noise threshold. For example, in one implementation, the quality component 308 determines an amount of noise (e.g., white noise) in an audio signal, compares the amount of noise to the high noise threshold, and classifies the audio signal based on the comparison. For instance, if the amount of noise in the audio signal exceeds the high noise threshold, then the audio signal is classified as having high noise (e.g., low quality, etc.).

The audio signal quality classifications can be used as a factor for determining one or more video characteristics. For instance, user-generated commentary is typically recorded using a microphone included in a laptop, web cam, digital camera, etc. that generates low quality audio signals (e.g., high noise). The characteristics component 202 can determine that a video segment corresponds to user-generated commentary based in part on the of the audio signal quality classification (e.g., low quality) for the video segment. Additionally or alternatively, in one implementation, the quality component 308 determines changes in audio signal quality. The changes in audio signal quality can be used to determine start points and/or stop points for video segments. For instance, if a first point in time in a video includes a low quality audio signal, and a second point in time in the video includes a high quality audio signal, then the change in audio quality between the first point and the second point can be used to determine a start point for a video segment following the change in audio quality, or a stop point for a video segment preceding the change in audio quality.

The speaker id component 310 detects, determines or otherwise identifies a set of people speaking (speakers) in a video. For example, in one implementation, the speaker id component 310 detects speech in a video, compares the detected speech against a set of audio data for known speakers (e.g., voice prints), and identifies the speaker based on the comparison. The identity of a speaker in a video can be a video characteristic and/or can be used as a factor for determining (e.g., by the organization component 114) one or more video characteristics. For instance, an identity of a speaker (e.g., a newscaster) included in a video segment can be used as a factor to determine a subject matter of the video segment (e.g., a news story). Aspects of the subject disclosure are not limited to the discussed techniques for speaker identification. For example, the speaker id component 310 can identify a speaker using a neural network, a hidden-markov model (HMM) based approach, or dynamic time warping (DTW) based speech recognition.

The transcription component 312 transcribes or converts speech included in a video to text, and analyzes the text (transcription). For example, in one implementation, the transcription component 312 identifies keywords included in a transcription based on a set of keyword criteria. The set of keyword criteria can include but is not limited to matching at least one word included in a predetermined set of keywords (e.g., keyword list, etc.). For instance, the transcription component 312 can match a set of words in the transcription to a name of a political event, and determine that a subject matter of the video segment relates to politics. As an additional or alternative example, in one implementation, the transcription component 312 identifies topic changes included in a transcription. For example, a first portion of a transcription may relate to football, and a second portion of the transcription may relate to basketball. Topic changes can be used to determine start points and/or stop points of video segments.

The video data component 304 analyzes video data (e.g., images, frames, etc.), and facilitates determination of video characteristics based on the analysis. The video data component 304 includes a slide component 314, a text component 316, a matching component 318, a change component 320, an object detection component 322, and an object location component 324. The slide component 314 identifies, detects, or otherwise determines that a portion of a video includes a set of still images (e.g., photographs, slides, etc.), and/or a set of animating (e.g., sliding, zooming, morphing, shuttering, etc.) still images. A viewer may desire to view a video of an award show acceptance speech, and a video including a set of still images from the award show may be undesirable.

The text component 316 identifies or detects floating text. Floating text can include but is not limited to text applied over a solid color background, a set of still images, and/or a set of animating still images. A viewer may desire to view a music video featuring their favorite artist, and a video that includes song lyrics as floating text may be undesirable. The matching component 318 compares sets of frames in a video with known videos, and identifies the video, or a portion of the video, based on a match with a known video, or a portion of a known video. For example, a sports highlight mash-up can include five separate basketball clips (e.g., 5 segments). The matching component 318 can compare sets of frames included in the video against known videos, and identify one or more the segments (e.g., as known clips) based on a match with portions of known videos. It is to be appreciated that the matching component 318 can employ virtually any technique for media matching, including but not limited to transformation invariant media matching, and/or feature extraction using reference frames.

The change component 320 determines, detects, or otherwise identifies a change or transition between scenes in a video (scene change). For instance, a first portion of a video can include user-generated commentary regarding a movie, and a second portion of the video can include a scene from the movie. The change component 320 identifies the scene change from the first portion to the second portion. For example, in one implementation, the change component 320 can compare video quality (e.g., pixels, etc.) between a first point and a second point in a video, and identify a scene change based on a change in quality between the first point and the second point. The scene changes can be used to determine (e.g., by the organization component 114) start and/or stop points of video segments.

The object detection component 322 identifies or detects objects included in a video. The identity of an object included in a video can be a video characteristic, and/or can be used as a factor for determining video characteristics. For instance, a video that includes a tablet computer may be a review of the tablet computer. It is to be appreciated that the object detection component 322 can employ virtually any technique for object detection, including but not limited to filter based object detection using hash functions, learn point-based feature matching, and/or SPEC hashing.

The object location component 324 monitors the location of one or more objects in a video. The location of an object in a video can be used as a factor for determining video characteristics. For instance, user-generated commentary typically includes a speaker who remains in substantially the same location throughout a video segment. As an additional or alternative example, sports clips typically include objects (e.g. people, balls, etc.) in virtually constant motion. It is to be appreciated that the object location component 324 can employ virtually any technique for object location monitoring, including but not limited to monitoring adaptive regions of interest, and/or facial recognition.

The associated data component 306 examines, inspects, or otherwise analyzes data and/or information associated with a video. The associated data component 306 includes a metadata component 326, a settings component 328, and a viewer data component 330. The metadata component 326 examines, inspects, or otherwise analyzes a set of a metadata associated with a video, and facilitates determination of one or more video characteristics based on the metadata. The metadata can include but is not limited to a title, a set of tags, a description, a set of video segments, a set of video characteristics, a watermark, and/or a set of copyright data. The settings component 328 determines a set of control parameters associated with a video (e.g., by a user 110). The control parameters can be factors used to determine video characteristics. For instance, if the control parameters include a user defined video category, the user defined category can be a factor in determining video characteristics.

The viewer data component 330 inspects, examines, or otherwise analyzes a set of viewer data associated with the video, and facilitates determination of video characteristics based on the analysis. For example, in one implementation, the viewer data component 330 determines whether a quantity of viewers that stop watching a video and/or skip ahead in the video at, or around, a first point satisfies a predetermined threshold. For instance, if the quantity of viewers does satisfy the predetermined threshold, then the first point can be determined to be a generally uninteresting or undesirable portion of the video, and viewers can be presented with the option to skip a video segment corresponding to the first point.

Figure 4:
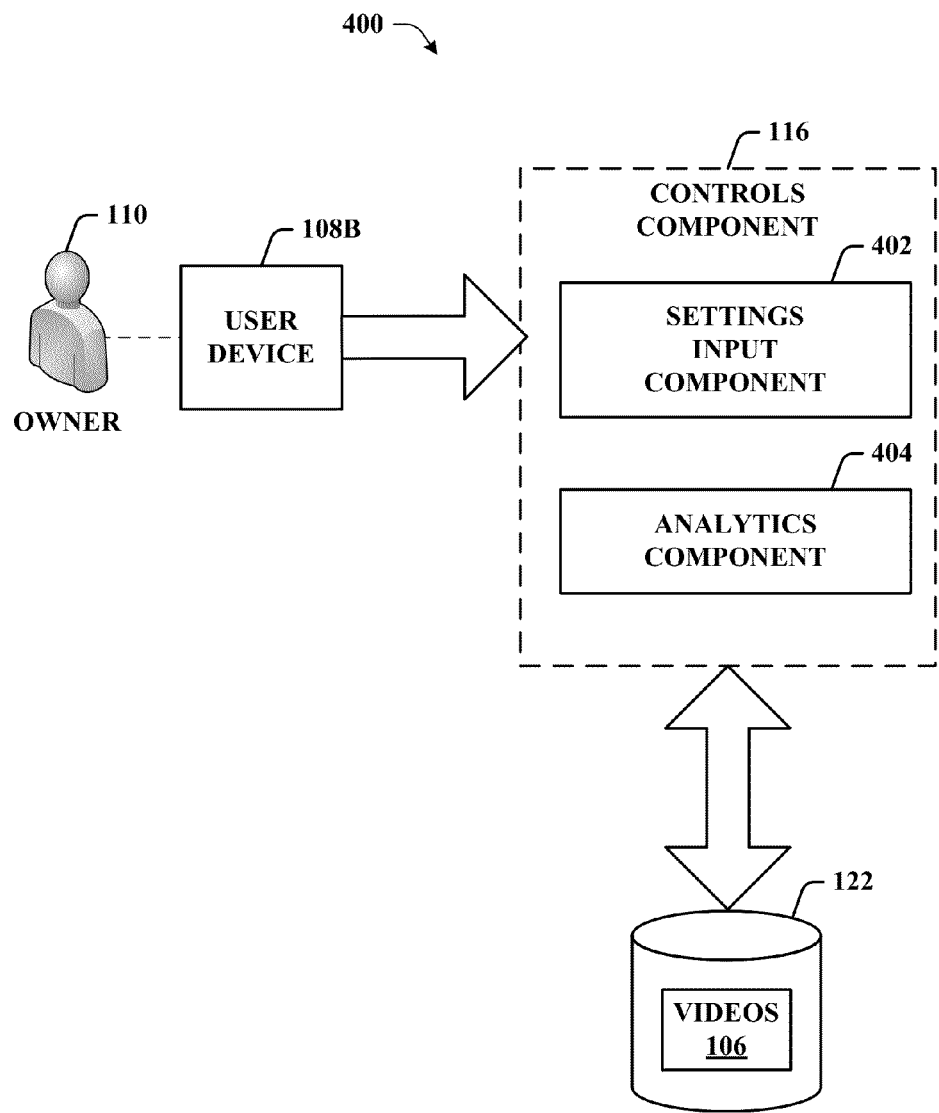
FIG. 4 illustrates an example controls component in accordance with various aspects described in this disclosure.

Turning now to FIG. 4, illustrated is an example controls component 116 in accordance with various aspects described in this disclosure. As discussed, the controls component 116 provides for a user 110 to determine, set, or otherwise control one or more control parameters regarding characteristics associated with a video. The controls component 116 in FIG. 4 includes a settings input component 402, and an analytics component 404. The settings input component 402 obtains, acquires, or otherwise receives control parameters from the user 110. The control parameters can include explicit user inputs (e.g., configuration selections, question/answer, etc.) such as from mouse selections, keyboard selections, touch screen selections, and/or speech. Additionally or alternatively, the inputs can include data uploads, wherein a data upload is a transfer of data from the user 110 or a third party source (e.g. computer or a computer readable medium), to the settings input component 402. For example, in one implementation, the user 110 can set a control parameter to prevent a subset of the characteristics from being associated with the video and/or provided to viewers (e.g., viewer 104).

The analytics component 404 provides the user 110 a set of viewer analytics for a video based at least in part on associated video characteristics. The set of viewer analytics can include but are not limited to a quantity (or percentage) of users that skip a video segment, a quantity of users that stop viewing at a video segment, a quantity of users that share a video segment, a quantity of users that add a video segment to a set of favorite video segments (e.g., favorites list), and/or data regarding advertising results by video segment. The viewer analytics can assist the user 110 in determining control parameters for the video, producing content, and achieving enhanced advertising results.

Figure 5:
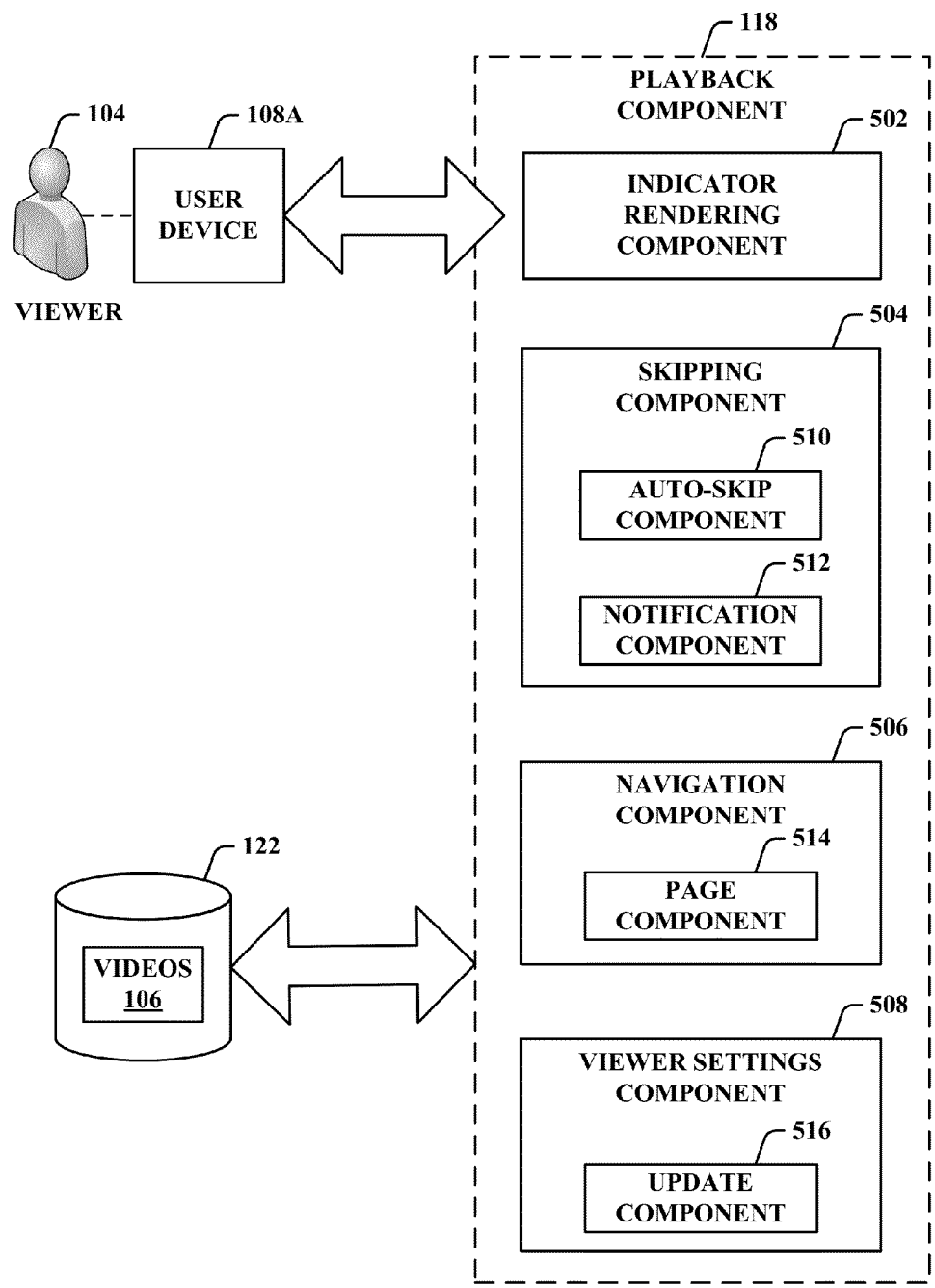
FIG. 5 illustrates an example playback component in accordance with various aspects described in this disclosure.

Referring to FIG. 5, illustrated is an example playback component 118 in accordance with various aspects described in this disclosure. As discussed, the playback component 118 streams, transmits, or otherwise plays videos from the set of videos 106, provides the associated indicators during playback, and provides for viewers (e.g., viewer 104) to control playback of the video based in part on the indicators. The playback component 118 in FIG. 5 includes an indicator rendering component 502, a skipping component 504, a navigation component 506, and a viewer settings component 508.

The indicator rendering component 502 (rendering component 502) provides, displays, or otherwise renders indicators associated with a video segment during playback of the video segment. The indicators can include colors, icons, flags, bits, and/or textual descriptors that provide information regarding video characteristics included in a video segment. For example, in one implementation, the rendering component 502 can provide colors corresponding to respective video characteristics with portions of a video seek bar (play/pause bar, time bar, etc.) representing video segments that include the respective characteristics (discussed in greater detail with reference to FIG. 7). As an additional or alternative example, in one implementation, the rendering component 502 provides a list of characteristics (characteristics list or list) included in a video, and updates the list based on playback (e.g., run-time, etc.) of the video. For instance, the list can include a first characteristic at first time, the first and a second characteristic at a second time, and the first, the second, a third, and a fourth characteristic at a third time. Aspects of the subject disclosure are not limited to a type of indicator. For example, the indicators can include but are not limited to colors, icons, flags, bits, and/or textual descriptors that provide information regarding video characteristics included in a video segment. In addition, aspects of the subject disclosure are not limited to a quantity of indicators. For example, X different indicators corresponding to respective X characteristics can be associated with a single video segment, where X is an integer. In addition, a first characteristic can be included in a plurality of video segments. For example, a first segment can include commentary, and the commentary can continue in a second segment including a second characteristic (overlapping characteristics).

The skipping component 504 provides for a viewer (e.g., viewer 104) to control playback of a video based on indicators and/or video segments. For example, in one implementation, an option to skip a video segment is provided to the viewer in conjunction with an associated indicator. The skipping component 504 includes an auto-skip component 510, and a notification component 512. The auto-skip component 510 does not play, omits from playback, or otherwise skips a video segment based at least in part on a set of viewer policies. For instance, a viewer can have a viewer policy to always skip a first type of video segment (e.g., commentary). As an additional or alternative example, the auto-skip component 510 automatically skips video segments based at least in part on a viewing pattern of a viewer, a viewing pattern of similar viewers, and/or related viewers. For instance, if the viewer skips a video segment having a first characteristic a quantity of times satisfying an auto-skip threshold, then the auto-skip component 510 can determine to automatically skip video segments having the first characteristic. The notification component 512 provides a notification to a viewer regarding a reason for skipping a video segment, and/or a suggestion to skip a video segment. The reasons and/or suggestions can include but are not limited to a viewer policy and a viewing pattern of the viewer.

The navigation component 506 provides for a viewer to locate, view, or otherwise navigate videos included in the set of videos 106 based on a set of video characteristics. For instance, a user may desire to view video segments that include a first characteristic (e.g., commentary by a first person) overlapping a second characteristic (e.g., the viewer's 104 favorite basketball team). The navigation component 506 locates, searches, or otherwise provides a set of video segments having shared or common characteristics (e.g., indicators). The navigation component 506 includes a page component 514. The page component 514 generates viewing pages that include subsets of the videos 106 based on video characteristics. The viewing pages provide for a viewer to consume videos and/or video segments. For instance, the page component 514 can generate a viewing page that includes a set of videos having a first video characteristic. Additionally or alternatively, the page component 514 can generate separate viewing pages for respective characteristics.

The viewer settings component 508 provides for a viewer 104 to set, control, or otherwise determine a set of viewer policies (e.g., viewer preferences, etc.). The set of viewer policies can include but are not limited to a prioritization (e.g., ordering, ranking, etc.) of a set of characteristics, a set of blocked characteristics, and/or a set of favorite characteristics. For instance, the set of blocked characteristics can include a set of characteristics that the viewer 104 does not desire to consume. For example, in one implementation, the viewer settings component 508 obtains, acquires, or otherwise receives the viewer policies from the viewer 104, e.g., via a network connection. The viewer policies can include explicit user inputs (e.g., configuration selections, question/answer, etc.) such as from mouse selections, keyboard selections, touch screen selections, and/or speech. Additionally or alternatively, the inputs can include data uploads, wherein a data upload is a transfer of data from the viewer 104 or a third party source (e.g. computer or a computer readable medium), to the viewer settings component 508.

The viewer settings component 508 includes an update component 516 that modifies, alters, or other updates viewer policies based on viewing patterns of the viewer 104. For instance, a first characteristic can be included in a set of blocked characteristics, and if a quantity of video segments having the first characteristic viewed by the viewer 104 satisfies a modification threshold, then the update component 516 can remove the first characteristic from the set of blocked characteristics. As an additional or alternative example, the update component 516 can update a set of characteristic prioritizations based on viewing patterns of the viewer 104. For instance, if the viewer 104 consumes (or skips) a characteristic a quantity of times satisfying a priority modification threshold, then the update component 516 can update (e.g., increase or decrease) the priority of the characteristic in the set of characteristic prioritizations.

The set of characteristic prioritizations can also include prioritizations for overlapping (e.g., combined, simultaneously present, etc.) characteristics. For instance, video segments containing both a first and a second characteristic can be prioritized over video segments containing a third characteristic. Characteristics may be displayed based at least in part on a set of prioritization criteria. The prioritization criteria can include but is not limited to a quantity of characteristics to be displayed (e.g., per video, per segment, etc.), and/or a prioritization ranking (e.g., top five, etc.) of characteristics.

Figure 6:
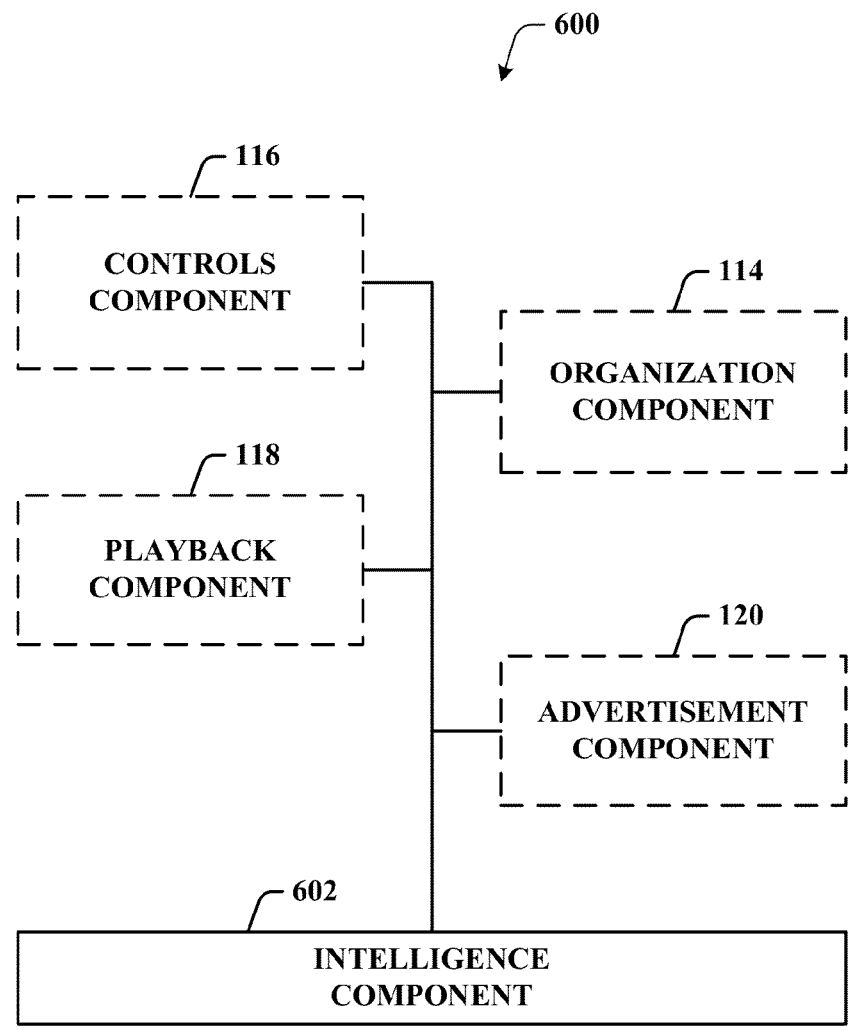
FIG. 6 illustrates an example system for video segment identification and organization based on dynamic characterizations in accordance with various aspects described in this disclosure.

FIG. 6 illustrates an example system 600 that employs an intelligence component 602 that facilitates video segment identification and organization based on dynamic characterizations in accordance with various aspects described in this disclosure. For example, all or portions of organization component 114, controls component 116, playback component 118, and/or advertisement component 120 are operatively coupled to intelligence component 602. Additionally or alternatively, all or portions of intelligence component 602 may be included in one or more components described in this disclosure. The intelligence component 602 can provide for or aid in various inferences or determinations. For example, in one implementation, the intelligence component 602 facilitates inferring video characteristics. As discussed, organization component 114 determines a set of characteristics included in a video (video characteristics). The intelligence component 602 can infer or determine a characteristic based in part on the analysis.

Accordingly, in order to provide for or aid in the numerous inferences described in this disclosure, intelligence component 602 examines the entirety or a subset of the data available and provides for reasoning about or infer states of the system, environment, client, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is used to develop models of priority.

Figure 7:
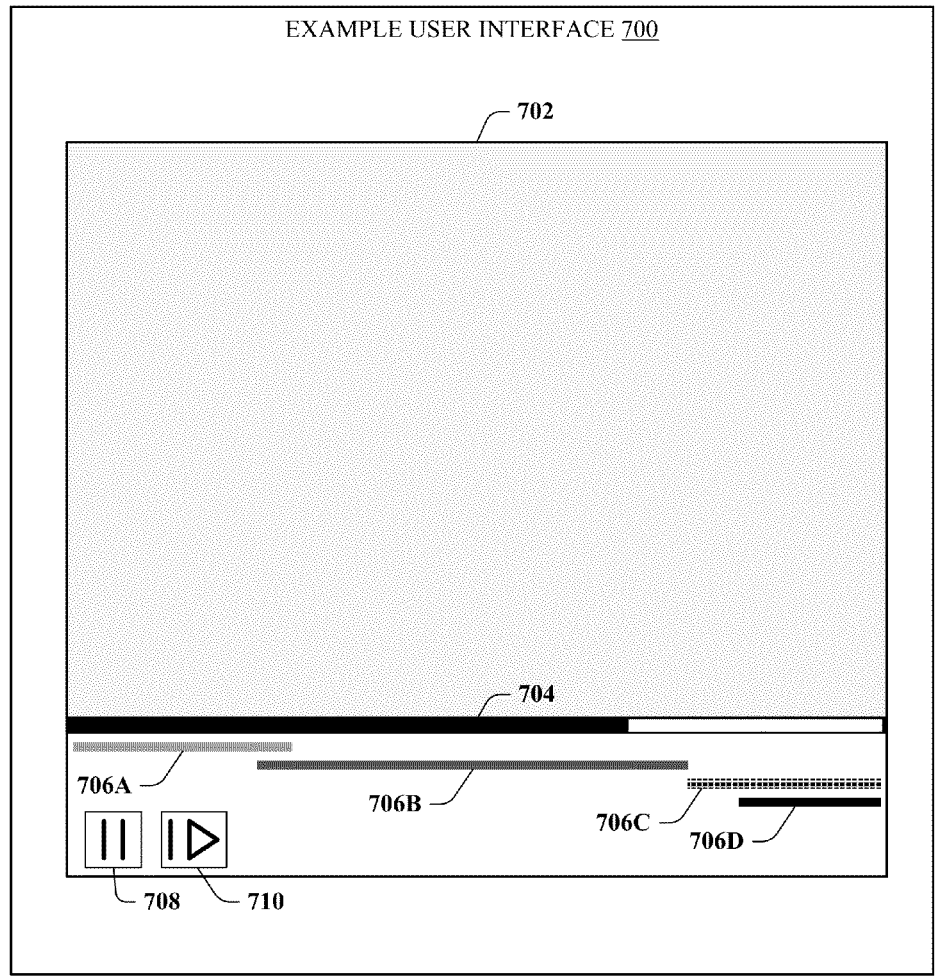
FIG. 7-10 illustrate systems that provide non-limiting examples of user interfaces in accordance with various aspects described in this disclosure.

Referring to FIG. 7, illustrated is a system that provides a non-limiting example of a user interface 700 in accordance with various aspects described in this disclosure. The interface 700 includes a video display window 702 that provides for viewing, replay, or play back of media content (e.g., video). The video display window 702 includes a video seek bar 704 that provides a graphical indicator of time lapse during play back of a video. Additionally or alternatively, the video seek bar 704 enables a viewer to select a point (e.g., time) in the video to view. For instance, the viewer can click on a location in the video seek bar 704 corresponding to a first time, and play back of the video will begin (or resume) from the first point.

The video display window further includes a set of indicators 706. The indicators 706 correspond to respective video characteristics. For example, in one implementation, the indicators 706 are associated with video segments at times represented by the video seek bar 704. For example, a first video segment includes a characteristic associated with a first indicator 706A, a second video segment includes a characteristic associated with a second indicator 706B, a third video segment includes a characteristic associated with a third indicator 706C, and a portion of the third segment includes a characteristic associated with a fourth indicator 708C. The video display window also includes a play/pause option 708, and a skip option 710. The skip option 710 provides for a viewer to skip a video segment. For instance, the viewer may not desire to view the second characteristic associated with the second indicator 706B, and can select the skip option 710 to advance play back from the first segment to the third segment.

Figure 8:
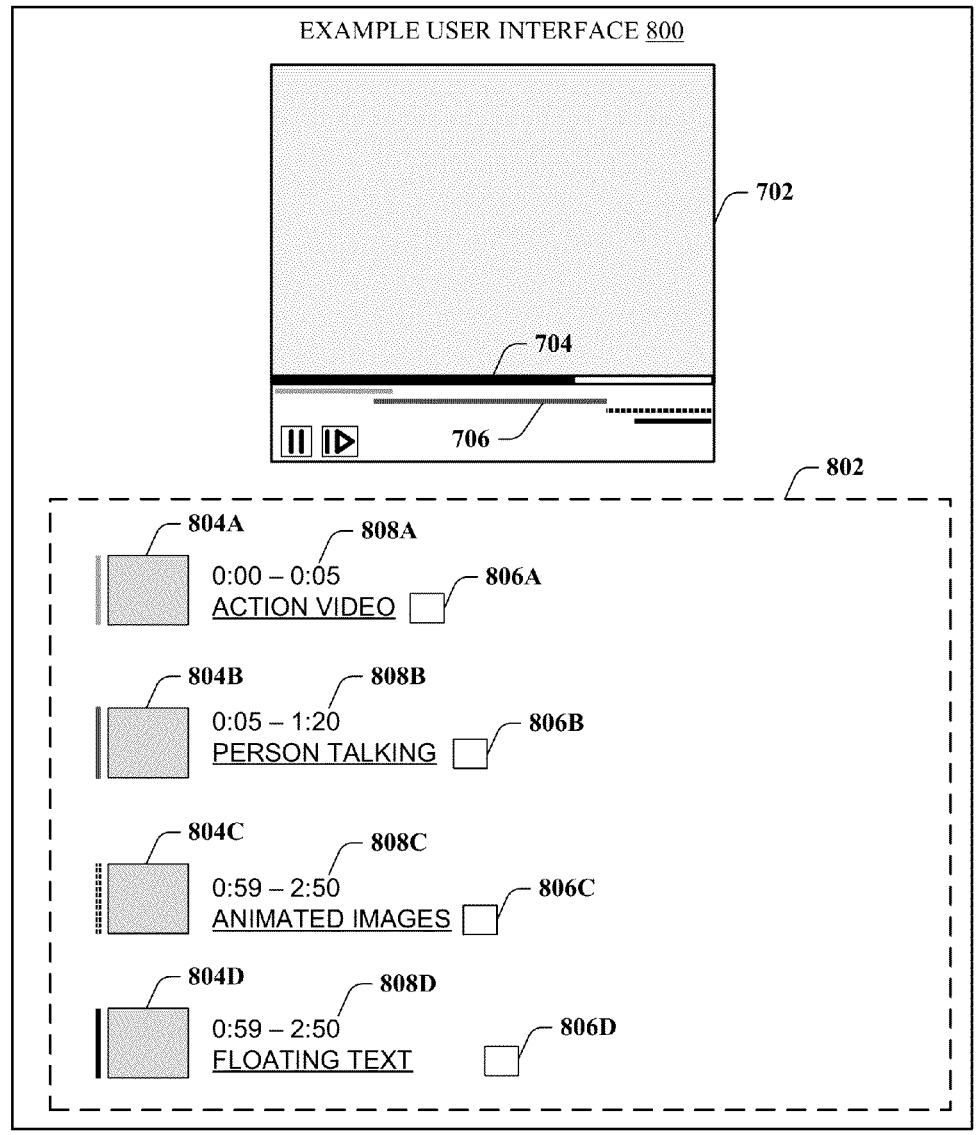

Referring to FIG. 8, illustrated is a system that provides a non-limiting example of a user interface 800 in accordance with various aspects described in this disclosure. The user interface 800 includes a video display window 702 that provides for viewing, replay, or play back of media content (e.g., video). The video display window 702 includes a video seek bar 704, and set of indicators 606. The video seek bar 704 provides a graphical indicator of time lapse during play back of a video, and/or enables a viewer to select a point in the video to view. The set of indicators 706 are associated with respective characteristics. For example, in one implementation, the indicators 706 are associated with segments of the video (video segments) having the corresponding characteristics.

The user interface 800 further includes a details section 802. The details section provides information and/or data regarding the indicators 706 and/or corresponding video segments. The details section 802 in FIG. 8 includes a set of segment thumbnails 804 (e.g., 804A-804D), a set of icons 806 (e.g., 806A-806D), and a set of segment data 808 (e.g., 808A-808D). The thumbnails 804 provide images (e.g., frame, etc.) from video segments associated with respective indicators. For instance, a first thumbnail 804A provides a frame from a video segment associated with a first indicator (e.g., indicator 706A). The icons 806 provide intuitive graphical representations of video characteristic corresponding to the indicators 706. For instance, an icon for floating text can include a pencil. The segment data 808 provides a set of data for a video segment. For instance, the segment data 808A includes a length of a video segment associated with the indicator 706A, and a description of video characteristics included in the video segment.

Figure 9:
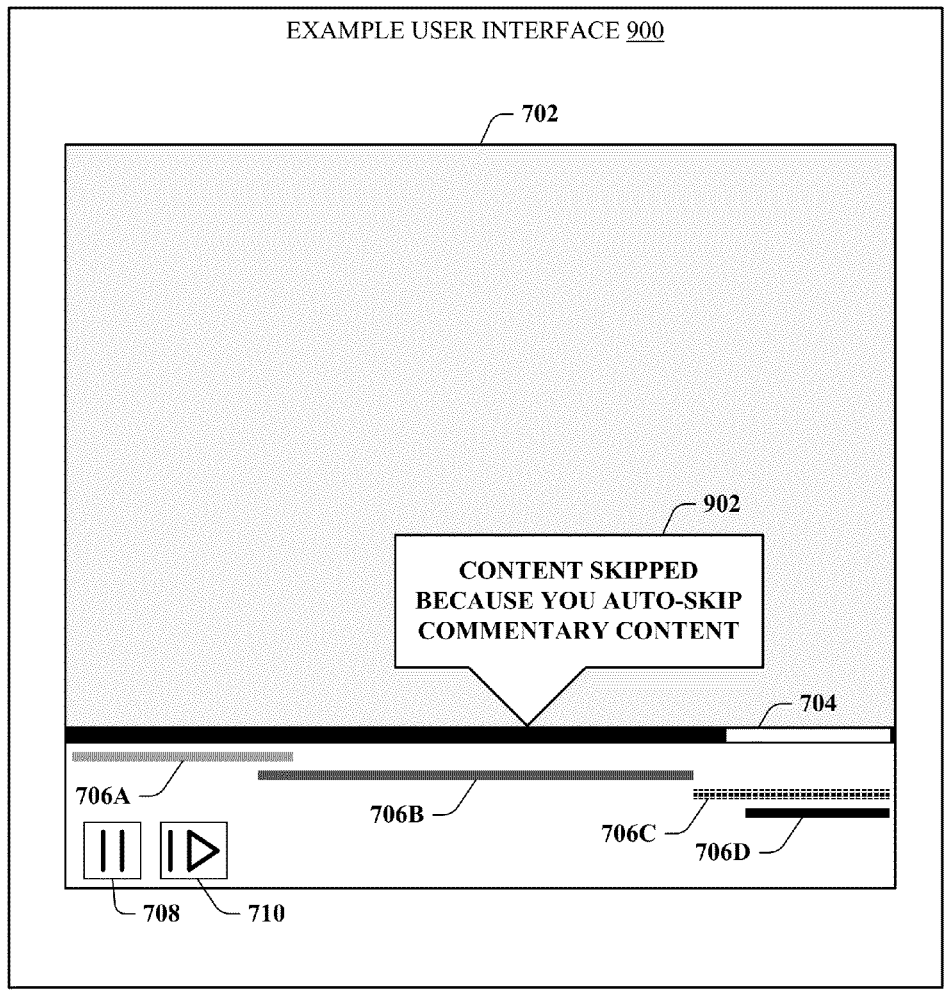

Referring to FIG. 9, illustrated is a system that provides a non-limiting example of a user interface 900 in accordance with various aspects described in this disclosure. The user interface 900 includes a video display window 702 that provides for viewing, replay, or play back of media content (e.g., video). The video display window 702 includes a video seek bar 704, and set of indicators 706. The video seek bar 704 provides a graphical indication of time lapse during play back of a video, and/or enables a viewer to select a point in the video to view. The set of indicators 706 are associated with respective characteristics. For example, in one implementation, the indicators 706 are associated with video segments having the respective corresponding characteristics.

As discussed, a video segment can be automatically skipped based at least in part on a set of viewer policies (e.g., using the auto-skip component 510). For instance, a viewer can set a viewer policy to always skip a first type of video segment (e.g., commentary). The user interface 900 provides a notification 902 to a viewer that includes a reason for automatically skipping a video segment (e.g., using the notification component 512). Additionally or alternatively, in one implementation, the user interface 900 can provide a notification that includes a suggestion to skip a video segment. The reasons and/or suggestions can include but are not limited to a viewer policy, a viewing pattern of the viewer, and/or viewing patterns of similar and/or related viewers.

Figure 10:
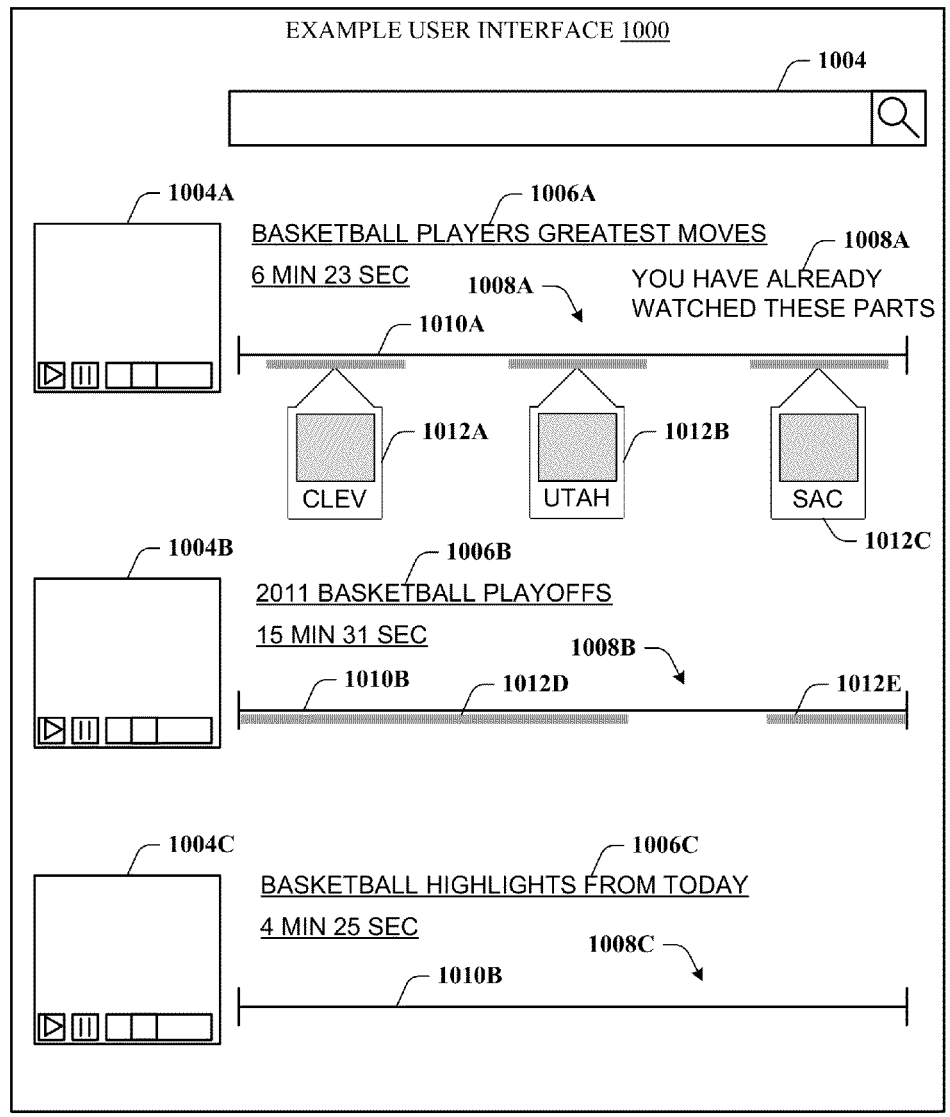

Referring to FIG. 10, illustrated is a system that provides a non-limiting example of a user interface 1000 in accordance with various aspects described in this disclosure. The interface 1000 can include but is not limited to a streaming page, a set of search results, and/or a viewing page. The interface 1000 includes a search bar 1002 and a set of videos 1004 (e.g., 1004A-1004C). The search bar 1002 provides for a viewer to search for videos included in a set of videos (e.g., videos 106). For instance, the viewer can search for videos containing basketball highlights, and the set of videos 1004 can be returned as a result of the search. A set of video data 1006 (e.g., 1006A-1006C) and segment data 1008 can be associated with each video in the set of videos 1004. The set of video data 1006 can include a title of the video, and/or a length of the video. The segment data 1008 can include a video seek bar 1010, a set of indicators 1012 associated with respective video segments, and a notification/suggestion 1014 based at least in part on the indicators. For instance, a first video 1004A can be a collection (e.g., mash-up) of highlights for a basketball player. The video data 1006A can include a title of the video (e.g., BASKETBALL PLAYERS GREATEST MOMENTS), and a length of the video (e.g., 6 MIN 23 SEC). A first indicator 1012A corresponds to a first video segment, and includes an intuitive representation of the contents of the first video segment. For example, in one implementation, the first indicator 1012A includes a thumbnail from the first video segment, and a caption detailing the contents of the first video segment. For instance, the caption can include a location (e.g., opposing team) in the first video segment. The notification 1008A provides the viewer information about the indicators 1012. For instance, the indicators correspond to video segments that the viewer has previously watched in other videos. Disparate compilation videos, such as, video compilations of greatest plays, may often contain some of the same video segments. The viewer may determine to skip video segments that they have already watched, or may have a policy to automatically skip previously watched segments.

Figure 11:
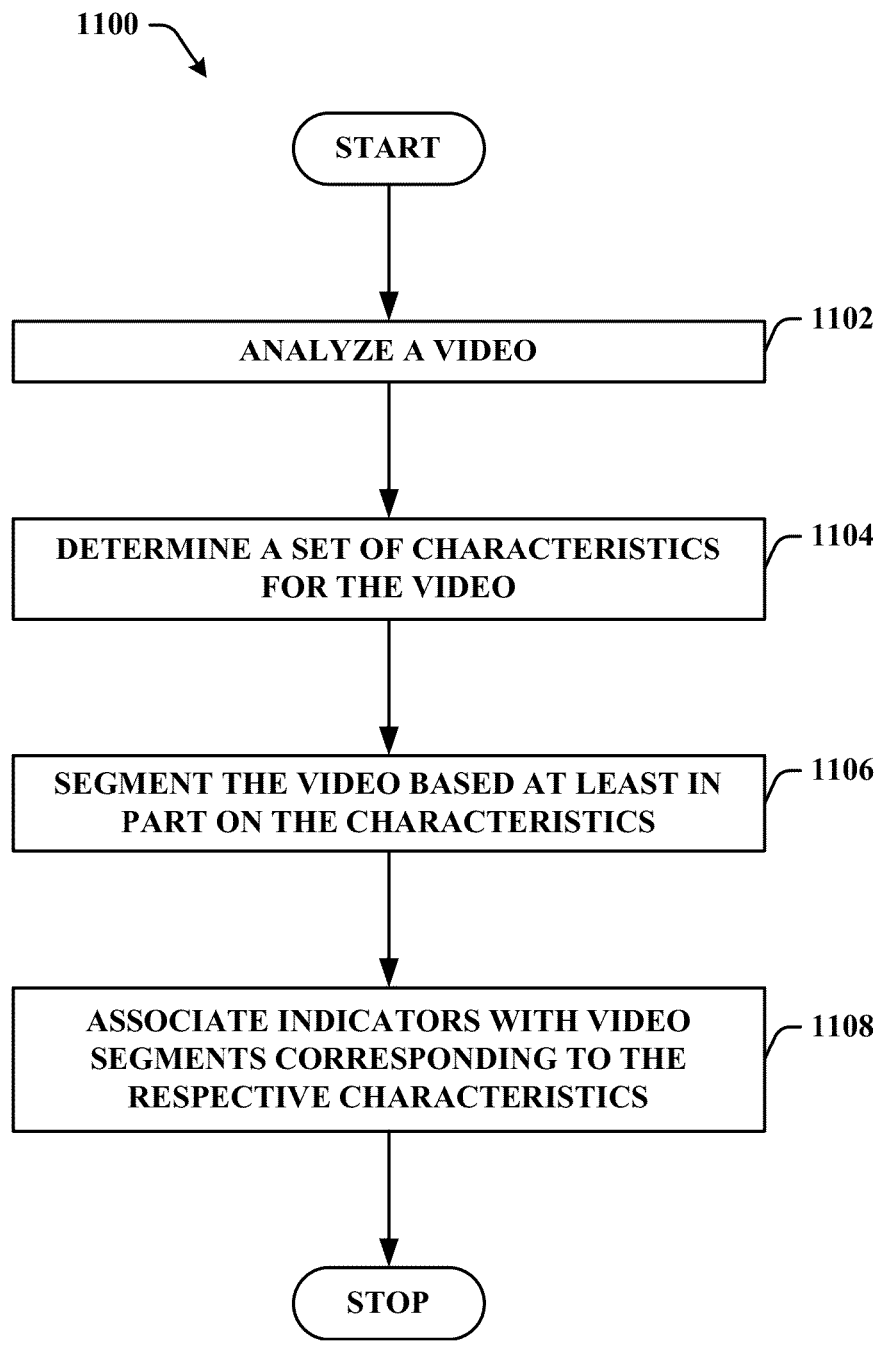
FIGS. 11-12 are example flow diagrams of respective methodologies for video segment identification and organization based on dynamic characterizations in accordance with various aspects described herein.
Figure 12:
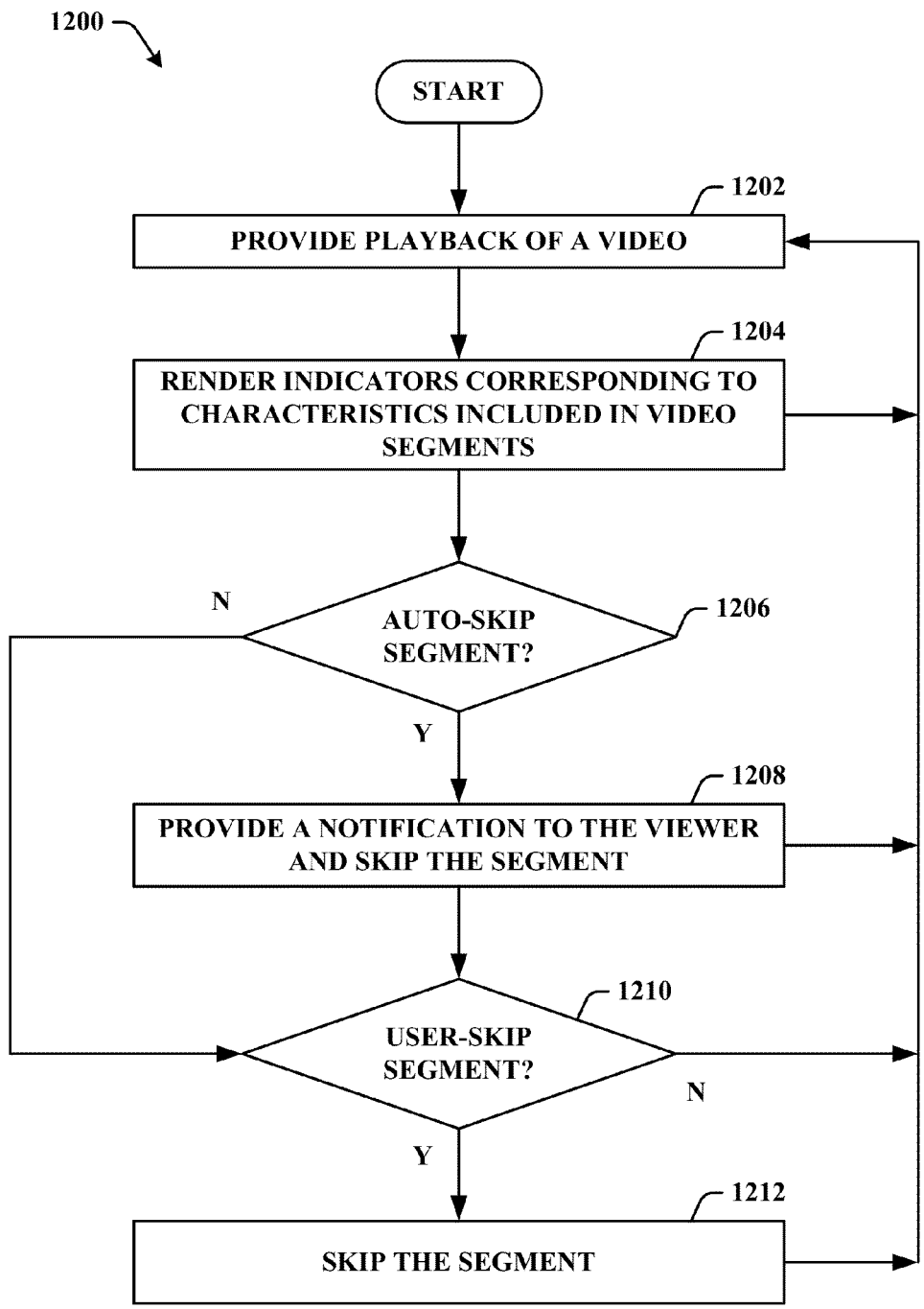

Non-Limiting Examples of Methods for Video Segment Identification and Organization Based on Dynamic Characterizations FIGS. 11-12 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 11, illustrated is an example methodology 1100 for video segment identification and organization based on dynamic characterizations in accordance with various aspects described in this disclosure. At reference numeral 1102, a video is analyzed (e.g., using the characteristics component 202). The analysis can include but is not limited to analyzing an audio signal included in the video, analyzing a set of images (e.g., frames, etc.) included in the video, and/or analyzing data associated with the video (e.g., metadata, control parameters, viewership patterns, etc.). At reference numeral 1104, a set of characteristics for the video (video characteristics) are determined based on the analysis (e.g., using the characteristics component 202). The characteristics can include but are not limited to a subject matter (e.g., news, sports, music, entertainment, movies, television, etc.), a content type (e.g., slide show, commentary, known clip, action scene, etc.), an identity of a person, and/or an identity of an object.

At reference numeral 1106, the video is split, divided or otherwise segmented based at least in part on the determined characteristics (e.g., using the segmenting component 204). For example, a first video segment can correspond to a portion of the video containing a first characteristic, and a second video segment can correspond to a portion of the video containing a second characteristic and a third characteristics. At reference numeral 1108, indicators are associated with the video segments corresponding to respective characteristics included in the video segments. Similar to a prior example, a first indicator can be associated with the first segment, and a second indicator and third indicator can be associated with the second segment. The indicators can include but are not limited to icons, colors, flags, bits, and/or textual descriptions. For instance, blue can be a color for a first indicator, and red can be a color for a second indicator.

The video segments and/or indicators provide for viewers to control playback of a video based in part on video characteristics. For example, a viewer may desire to view a sports clip, but may be uninterested in commentary. The viewer can fast forward or skip video segments containing commentary. In addition, the viewer can quickly identify videos that include primarily, or solely, commentary about a sports clip instead of a desired sports clip. Additionally or alternatively, in one implementation, viewers (e.g., a viewer 104) and/or content owners (e.g., a user 110) can create playlists of video segments and/or share video segments. For instance, a viewer may desire to share (e.g., via a social networking website) a first video segment that includes commentary, or create a playlist of slam dunks by a favorite basketball player and not include commentary. Additionally or alternatively, in one implementation, the video segments provide for advertising within a video. For instance, a perfume company may desire to advertise a new scent during video segments including a celebrity endorsing the scent.

Referring now to FIG. 12, illustrated is an example methodology 1200 for video segment identification and organization based on dynamic characterizations in accordance with various aspects described in this disclosure. At reference numeral 1202, playback of a video is provided (e.g., using the playback component 118). At reference numeral 1204, indicators corresponding to characteristics included in respective video segments are rendered (e.g., using the rendering component 502). The indicators can include but are not limited to colors, icons, flags, bits, and/or textual descriptors. At reference numeral 1206, a determination is made whether to automatically skip (auto-skip) a video segment (e.g., using the auto-skip component 510). For example, the video segment can be automatically skipped based on a viewer policy, a viewing pattern of the viewer, and/or viewing patterns of similar and/or related viewers. At reference numeral 1208, if it is determined to auto-skip the segment (Y at 1206), then the video segment is automatically skipped, a notification is provided (e.g., using the notification component 512), and the methodology returns to reference numeral 1202. The notification includes a reason for skipping the video segment, including but not limited to a viewer policy, a viewing pattern of the viewer, and/or a viewing pattern of similar and/or related viewers.

Returning to reference numeral 1208, if it is determined not to auto-skip the segment (N at 1206), then at reference numeral 1210 a determination is made whether a viewer skip command (user-skip) has been received (e.g., using the skipping component 504). For instance, the viewer can select, click, or otherwise activate a skip option (e.g., using skip option 710). As an additional or alternative example, in one implementation, a suggestion to skip a video segment can be provided. The suggestion can be based on a set of viewer policies, a previous viewing pattern of the viewer, and/or viewing patterns of similar and/or related viewers. At reference numeral 1214, if it is determined that the user-skip has been received (Y at 1210), then the video segment is skipped, and the methodology returns to reference numeral 1202. Returning to reference numeral 1210, if it is determined that the user-skip has not been received, then the methodology returns to reference numeral 1202.

Exemplary Networked and Distributed Environments

One of ordinary skill in the art can appreciate that the various implementations described herein can be implemented in connection with any computer or other client or server device, which can be deployed as part of a computer network or in a distributed computing environment, and can be connected to any kind of data store where media may be found. In this regard, the various implementations described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various implementations of this disclosure.

Figure 13:
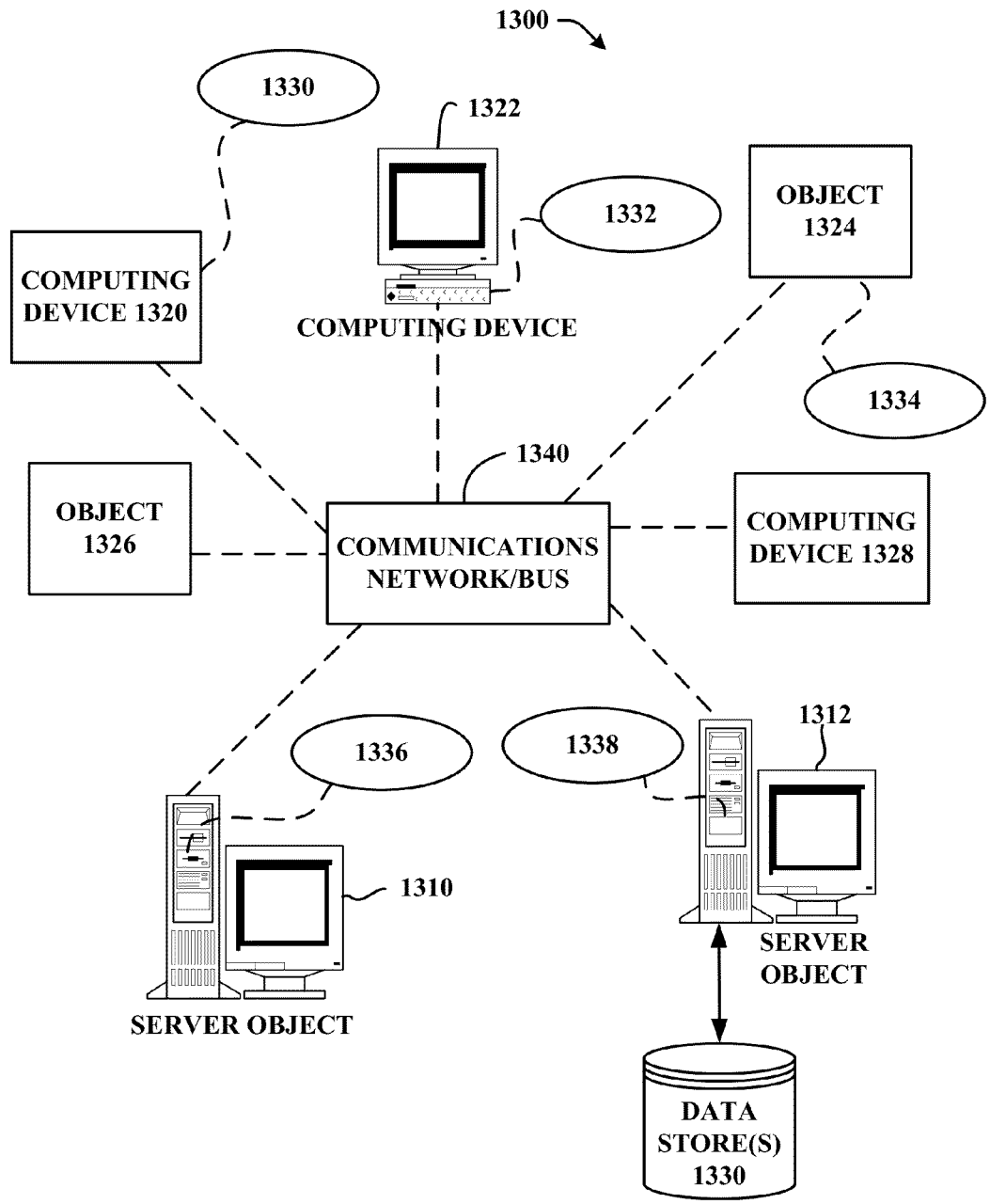
FIG. 13 is a block diagram representing an exemplary non-limiting networked environment in which the various implementations can be implemented.

FIG. 13 provides a schematic diagram of an exemplary networked or distributed computing environment. It is to be appreciated that the distributed computing environment 1300 can be used in connection with implementing one or more of the systems or components shown and described in connection with FIGS. 1-6. The distributed computing environment comprises computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338. For instance, the computing device 1322 can include user device 108A and/or 108B. In addition, server object 1310 and/or server object 1312 can include the media component 102, and the applications 1330, 1332, 1334, 1336, 1338 can include the organization component 114, controls component 116, playback component 118, and/or advertisement component 120. It can be appreciated that computing objects or devices 1320, 1322, 1324, 1326, 1328, etc. may comprise different devices, such as smart phones, cell phones, personal digital assistants (PDAs), tablets, laptops, desktops, portable music players, video game systems, electronic readers (e-readers), global positioning systems (GPS), set-top boxes, televisions, etc.

Each computing object 1310, 1312, etc. and computing objects or devices 1320, 1322, 1324, 1326, 1328, etc. can communicate with one or more other computing objects 1310, 1312, etc. and computing objects or devices 1320, 1322, 1324, 1326, 1328, etc. by way of the communications network 1340, either directly or indirectly. Even though illustrated as a single element in FIG. 13, network 1340 may comprise other computing objects and computing devices that provide services to the system of FIG. 13, and/or may represent multiple interconnected networks, which are not shown. Each computing object 1310, 1312, etc. or computing objects or devices 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of the various implementations of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various implementations.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects 1310, 1312, etc. can be thought of as servers where computing objects 1310, 1312, etc. provide data services, such as receiving data from client computing objects or devices 1320, 1322, 1324, 1326, 1328, etc., storing of data, processing of data, transmitting data to client computing objects or devices 1320, 1322, 1324, 1326, 1328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1340 is the Internet, for example, the computing objects 1310, 1312, etc. can be Web servers with which the client computing objects or devices 1320, 1322, 1324, 1326, 1328, etc. communicate via any of a number of known protocols, such as the hypertext transfer protocol (HTTP). Objects 1310, 1312, etc. may also serve as client computing objects or devices 1320, 1322, 1324, 1326, 1328, etc., as may be characteristic of a distributed computing environment.

Exemplary Computing Device

Figure 14:
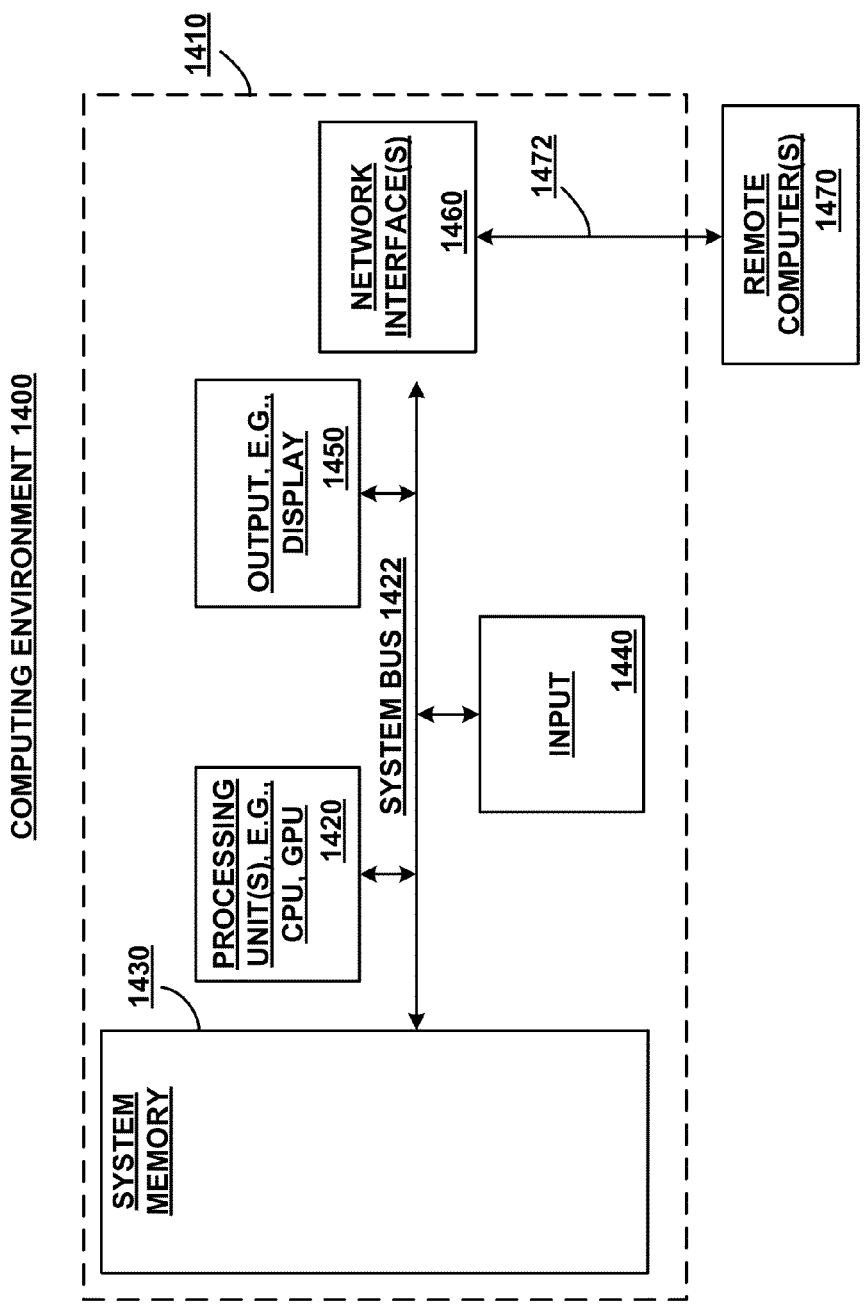
FIG. 14 is a block diagram representing an exemplary non-limiting computing system or operating environment in which the various implementations may be implemented.

As mentioned, advantageously, the techniques described herein can be applied to any device suitable for implementing various implementations described herein. Handheld, portable and other computing devices and computing objects of all kinds are contemplated for use in connection with the various implementations, e.g., anywhere that a device may wish to read or write transactions from or to a data store. Accordingly, the below general purpose remote computer described below in FIG. 14 is but one example of a computing device. It is to be appreciated that the computer 1410 can be used in connection with implementing one or more of the systems or components shown and described in connection with FIGS. 1-10. For instance, the computer 1410 can include a media component (e.g., media component 102) and/or a user device (e.g., user device 108A and/or 108B). The user device can include, such as smart phones, cell phones, personal digital assistants (PDAs), tablets, laptops, desktops, portable music players, video game systems, electronic readers (e-readers), global positioning systems (GPS), set-top boxes, televisions, etc.

Although not required, implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 14 thus illustrates an example of a suitable computing system environment 1400 in which one or aspects of the implementations described herein can be implemented, although as made clear above, the computing system environment 1400 is only one example of a suitable computing environment and is not intended to suggest any limitation as to scope of use or functionality. Neither is the computing environment 1400 be interpreted as having any dependency or requirement relating to any one or combination of components illustrated in the exemplary operating environment 1400.

With reference to FIG. 14, an exemplary remote device for implementing one or more implementations includes a general purpose computing device in the form of a computer 1410. Components of computer 1410 may include, but are not limited to, a processing unit 1420, a system memory 1430, and a system bus 1422 that couples various system components including the system memory to the processing unit 1420.

Computer 1410 includes a variety of computer readable media and can be any available media that can be accessed by computer 1410. The system memory 1430 may include computer storage media in the form of volatile and/or nonvolatile memory such as read only memory (ROM) and/or random access memory (RAM). By way of example, and not limitation, memory 1430 may also include an operating system, application programs, other program modules, and program data.

A user can enter commands and information into the computer 1410 through input devices 1440. A monitor or other type of display device is also connected to the system bus 1422 via an interface, such as output interface 1450. In addition to a monitor, computers can also include other peripheral output devices such as speakers and a printer, which may be connected through output interface 1450.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1472, such local area network (LAN) or a wide area network (WAN), but may also include other networks/buses. Such networking environments are commonplace in homes, offices, enterprise-wide computer networks, intranets and the Internet.

As mentioned above, while exemplary implementations have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various implementations described herein, it is to be understood that other similar implementations can be used or modifications and additions can be made to the described implementation(s) for performing the same or equivalent function of the corresponding implementation(s) without deviating there from. Still further, multiple processing chips or multiple devices can share the performance of one or more functions described herein, and similarly, storage can be effected across a plurality of devices. Accordingly, the subject disclosure is not to be limited to any single implementation, but rather can be construed in breadth, spirit and scope in accordance with the appended claims.

What is claimed is:

1. A system, comprising:
a memory storing computer executable components; and
a processor configured to execute the following computer executable components stored in the memory:
    a characteristics component that analyzes a video, and determines a set of video characteristics included in the video based at least in part on the analysis, wherein the video characteristics include at least one of: a category, a type, an identity of a person, an identity of an object, or a location;
    a settings input component that receives input specifying a set of control parameters indicating at least one video characteristic of the set of video characteristics for which a respective indicator is not to be appended to the video;
    an indicator component that appends to the video respective indicators corresponding to the video characteristics in the set of video characteristics according to the set of control parameters; and
    a segmenting component that demarcates a plurality of segments within the video based at least in part on the set of video characteristics.

2. The system of claim 1, further comprising an audio data component that analyzes audio data included in the video, and facilitates determination of a first subset of video characteristics based on the analysis of the audio data.

3. The system of claim 2, wherein the audio data component, based on the analysis of the audio data, at least one of: determines an audio signal quality classification, determines an identity of a speaker, or transcribes speech included in the video.

4. The system of claim 1, further comprising a video data component that analyzes image data included in the video, and facilitates determination of a second subset of the video characteristics based on the analysis of the image data.

5. The system of claim 1, further comprising a viewer data component that analyzes viewer data associated with the video, and facilitates determination of a third subset of the video characteristics, based on the analysis of the viewer data, that represent an uninteresting portion of the video.

6. The system of claim 5, wherein the third subset of the video characteristics is based upon a quantity of viewers that stop watching the video during the uninteresting portion meeting a predetermined threshold.

7. The system of claim 1, further comprising an advertisement component that provides at least one advertisement, associated with at least one advertiser, based on the indicators.

8. A system, comprising:
a memory storing computer executable components; and
a processor configured to execute the following computer executable components stored in the memory:
a settings input component that receives input specifying a set of control parameters indicating at least one video characteristic included in the video for which a respective indicator is not to be appended to the video;
a playback component that provides playback of a video;
a rendering component that renders, during the playback of the video, indicators corresponding to respective video characteristics included in segments of the video according to the set of control parameters, wherein the video characteristics include at least one of: a category, a type, an identity of a person, or an identity of an object; and
a skipping component that provides for skipping, during the playback of the video, at least one segment of the video based at least in part on the indicators.

9. The system of claim 8, wherein the skipping component provides for the skipping the at least one segment based on input received from a viewer.

10. The system of claim 8, wherein the skipping component provides for the skipping the at least one segment based on a viewer policy.

11. The system of claim 10, further comprising: a settings component that receives the viewer policy from the viewer.

12. The system of claim 11, further comprising: an update component that modifies the viewer policy based at least in part on at least one of a viewing pattern of the viewer, or a set of viewing patterns for at least one of a set of viewers similar to the viewer or a set of viewers related to the viewer.

13. The system of claim 12, wherein the viewer policy includes at least one of: a prioritization of a set of video characteristics, a set of blocked characteristics, or a set of favorite characteristics.

14. The system of claim 13, wherein the prioritization of the set of video characteristics includes prioritizations of overlapping characteristics.

15. The system of claim 10, further comprising: a notification component that provides at least one of a reason for skipping the at least one segment or a suggestion to skip the at least one segment.

16. The system of claim 8, further comprising a navigation component that locates a set of videos based on at least one of a set of video characteristics or a set of overlapping video characteristics.

17. The system of claim 8, further comprising: a page component that generates a viewing page that includes a set of videos including a set of video characteristics.

18. A method, comprising:
analyzing, by a system including a processor, at least one of audio data included in a video, image data included in the video, or data associated with the video;
determining, by the system, a set of video characteristics included in the video based at least in part on the analysis;
receiving, by the system, input specifying a set of control parameters indicating at least one video characteristic of the set of video characteristics for which a respective indicator is not to be appended to the video;
demarcating, by the system, a plurality of segments within the video based at least in part on the set of video characteristics; and
attaching, by the system, a set of indicators to the video corresponding to respective video characteristics in the set of video characteristics according to the set of control parameters.

19. The method of claim 18, wherein a subset of the control parameters are determined by a content owner.

20. The method of claim 18, further comprising providing at least one advertisement, associated with at least one advertiser, based at least in part on the set of indicators.

21. The method of claim 18, analyzing viewing patterns of a set of viewers for the set video characteristics included in the video, and based on the analysis providing a set of video analytics to an owner of the video.

22. The method of claim 21, wherein the set of video analytics includes at least one of, a quantity of users that stop viewing the video at a video segment, a quantity of users that share a video segment, a quantity of users that add a video segment to a set of favorite video segments, or data regarding advertising results by video segment.

23. The method of claim 18, further comprising displaying, during playback of a first point in the video, a characteristics list including a first subset of the video characteristics corresponding to the first point.

24. The method of claim 23, further comprising displaying, during playback of a second point in the video, the characteristics list including a second subset of the video characteristics corresponding to the second point.

* * * * *